US011930969B1

(12) United States Patent
Staton

(10) Patent No.: US 11,930,969 B1
(45) Date of Patent: Mar. 19, 2024

(54) SHOWER-CLEANING APPARATUS

(71) Applicant: Donald Staton, Colorado Springs, CO (US)

(72) Inventor: Donald Staton, Colorado Springs, CO (US)

( * ) Notice: Subject to any disclaimer, the term of this patent is extended or adjusted under 35 U.S.C. 154(b) by 573 days.

(21) Appl. No.: 17/164,913

(22) Filed: Feb. 2, 2021

(51) Int. Cl.
*A47K 3/28* (2006.01)
*B08B 3/02* (2006.01)

(52) U.S. Cl.
CPC .............. *A47K 3/281* (2013.01); *B08B 3/024* (2013.01)

(58) Field of Classification Search
None
See application file for complete search history.

(56) References Cited

U.S. PATENT DOCUMENTS 2,997,722 A * 8/1961 Pearson .................... E03C 1/06 4/678
D313,067 S 12/1990 Kotake
5,028,077 A 7/1991 Hurst
5,375,887 A 12/1994 Johnson
7,707,664 B1 5/2010 Flynn
2003/0042337 A1 3/2003 Liang
2004/0217196 A1 11/2004 Yurek
2006/0026750 A1 2/2006 Ballance
2018/0318886 A1* 11/2018 Libbrecht ............. E03C 1/0408

FOREIGN PATENT DOCUMENTS

WO 2018208689 11/2018

* cited by examiner

*Primary Examiner* — Cristi J Tate-Sims
(74) *Attorney, Agent, or Firm* — Kyle A. Fletcher, Esq.

(57) ABSTRACT

The shower-cleaning apparatus is configured for use with a supply side source. The supply side source further comprises a source pipe and a third exterior screw thread. The shower-cleaning apparatus removably attaches to the third exterior screw thread. The shower-cleaning apparatus forms a fluidic connection that allows for the water flowing through the source pipe to be targeted at specific locations for cleaning purposes. The shower-cleaning apparatus incorporates a hose, a nozzle apparatus, and a source apparatus. The nozzle apparatus attaches to the hose. The source apparatus attaches to the hose. The source apparatus forms a detachable fluidic connection to the source pipe. The hose transports water from the source apparatus to the nozzle apparatus. The nozzle apparatus discharges the water received from the source pipe into the shower. In the first potential embodiment of the disclosure, the supply side source is a shower.

18 Claims, 4 Drawing Sheets

SHOWER-CLEANING APPARATUS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of cleaning including cleaning methods further involving the use of a liquid, more specifically, cleaning by the force of jets or sprays. (B08B3/02)

SUMMARY OF INVENTION

The shower-cleaning apparatus is configured for use with a supply side source. The supply side source further comprises a source pipe and a third exterior screw thread. The shower-cleaning apparatus removably attaches to the third exterior screw thread. The shower-cleaning apparatus forms a fluidic connection that allows for the water flowing through the source pipe to be targeted at specific locations for cleaning purposes. The shower-cleaning apparatus comprises a hose, a nozzle apparatus, and a source apparatus. The nozzle apparatus attaches to the hose. The source apparatus attaches to the hose. The source apparatus forms a detachable fluidic connection to the source pipe. The hose transports water from the source apparatus to the nozzle apparatus. The nozzle apparatus discharges the water received from the source pipe into the shower. In the first potential embodiment of the disclosure, the supply side source is a shower.

These together with additional objects, features and advantages of the shower-cleaning apparatus will be readily apparent to those of ordinary skill in the art upon reading the following detailed description of the presently preferred, but nonetheless illustrative, embodiments when taken in conjunction with the accompanying drawings.

In this respect, before explaining the current embodiments of the shower-cleaning apparatus in detail, it is to be understood that the shower-cleaning apparatus is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the shower-cleaning apparatus.

It is therefore important that the claims be regarded as including such equivalent construction insofar as they do not depart from the spirit and scope of the shower-cleaning apparatus. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
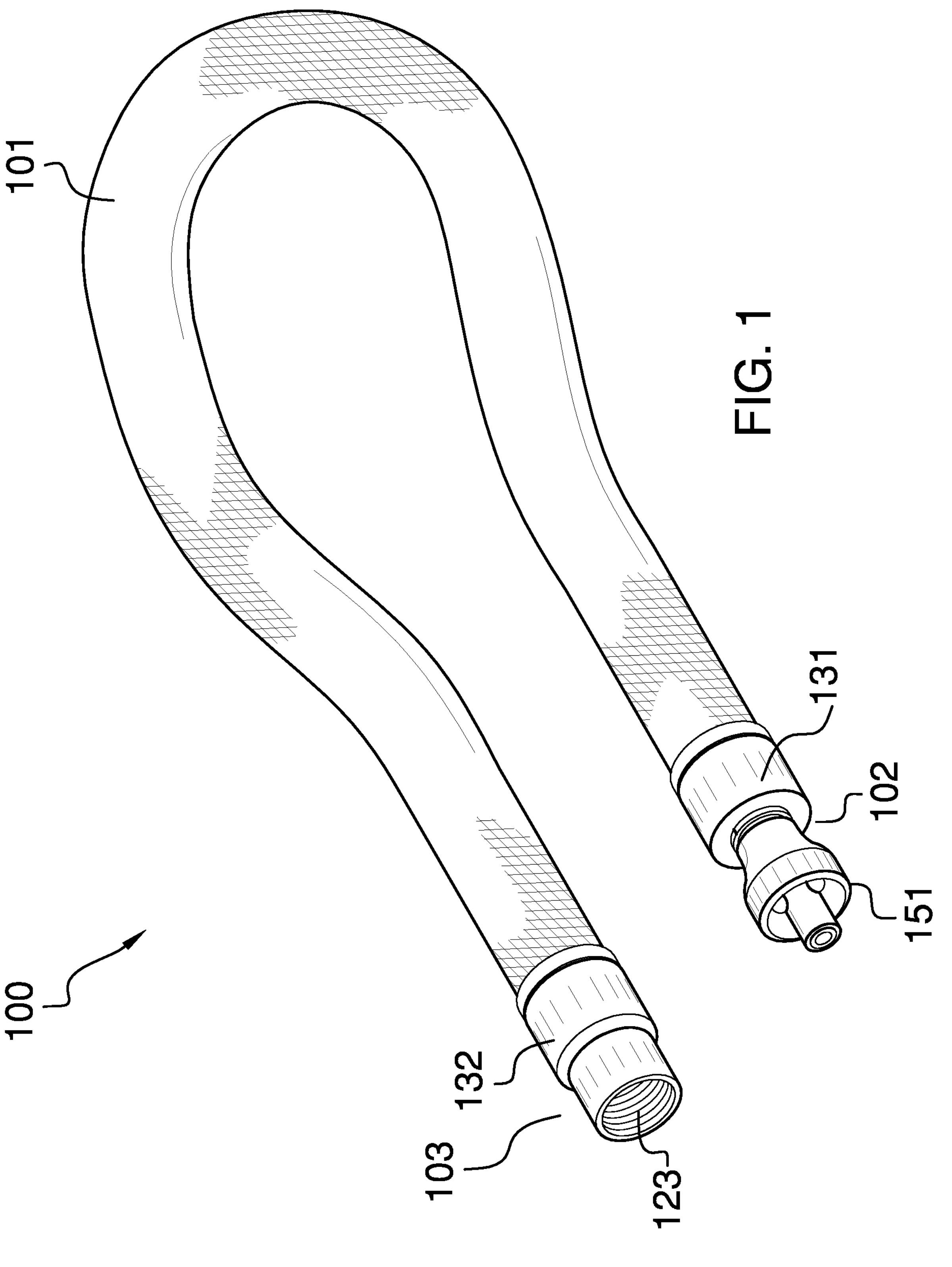
FIG. 1 is a perspective view of an embodiment of the disclosure.
Figure 2:
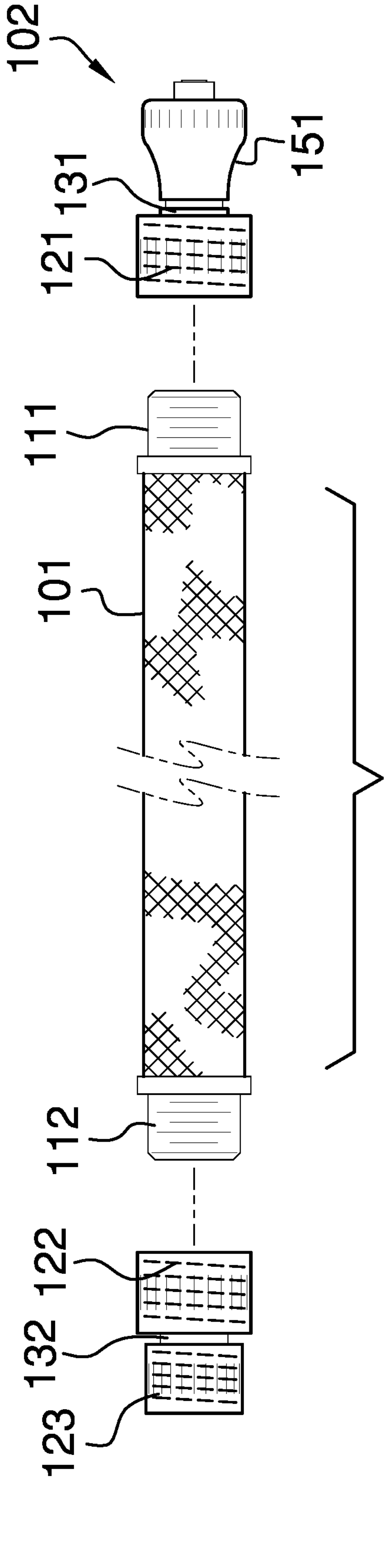
FIG. 2 is an exploded view of an embodiment of the disclosure.
Figure 3:
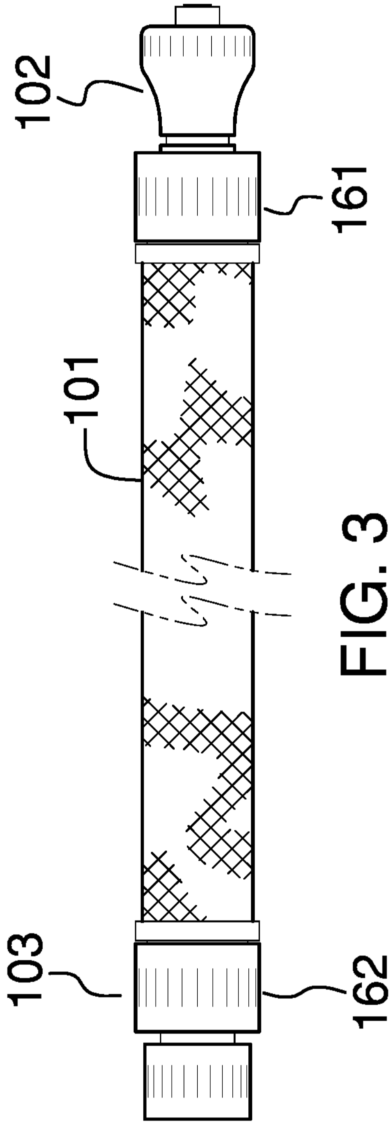
FIG. 3 is a front view of an embodiment of the disclosure.
Figure 4:
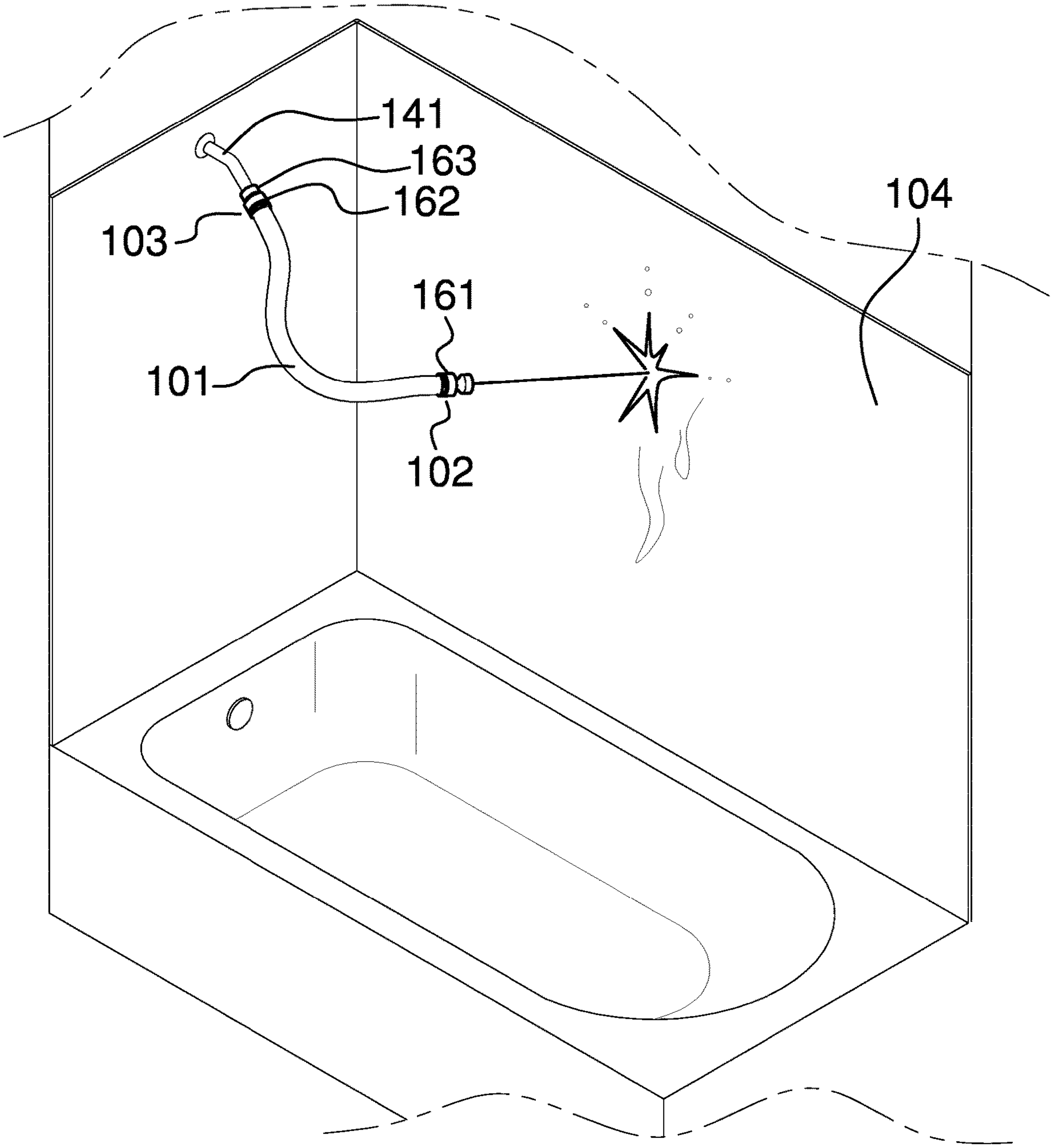
FIG. 4 is an in-use view of an embodiment of the disclosure.
Figure 5:
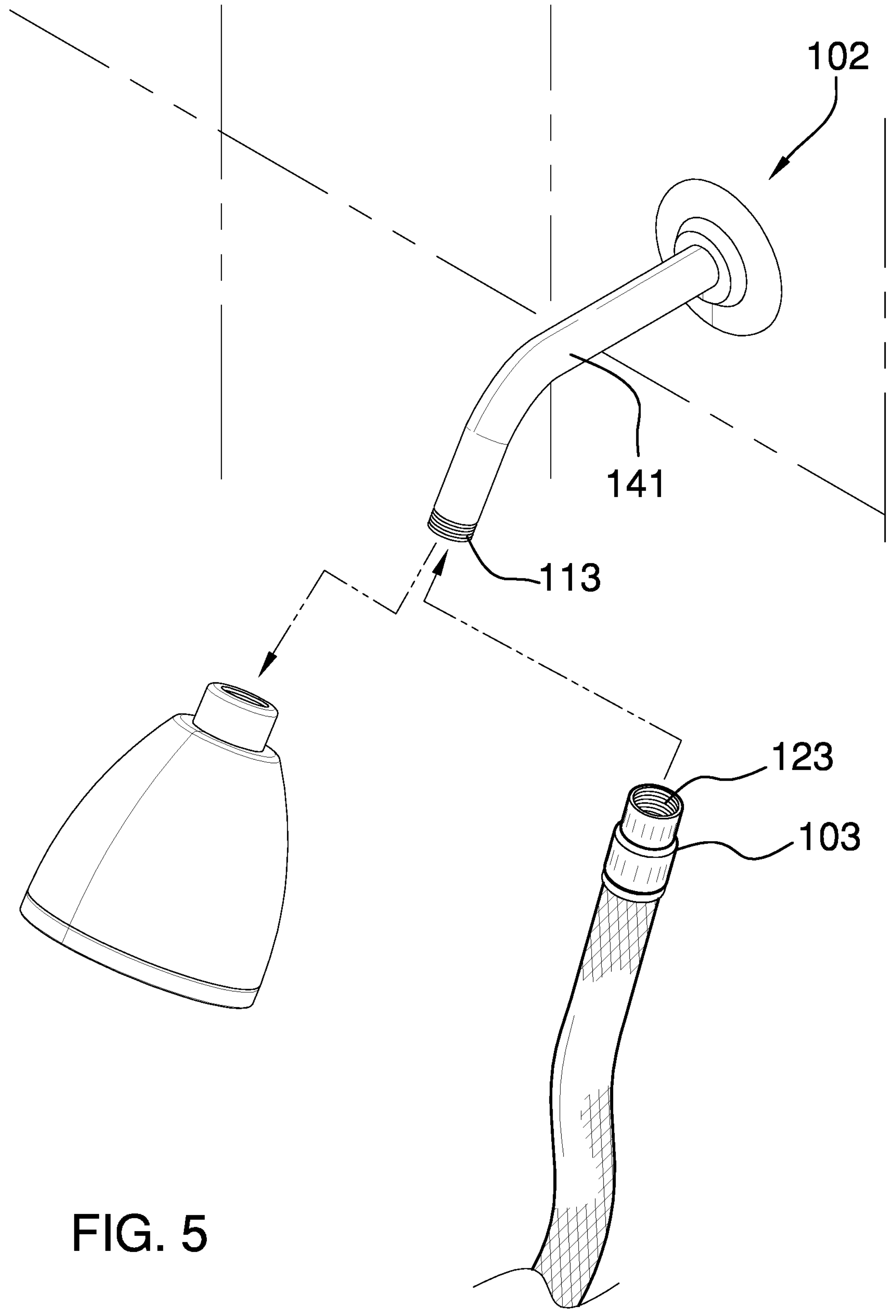
FIG. 5 is an in-use view of an embodiment of the disclosure.

Detailed reference will now be made to one or more potential embodiments of the disclosure, which are illustrated in FIGS. 1 through 5.

The shower-cleaning apparatus 100 (hereinafter invention) is configured for use with a supply side source 104. The supply side source 104 further comprises a source pipe 141 and a third exterior screw thread 113. The invention 100 removably attaches to the third exterior screw thread 113. The invention 100 forms a fluidic connection that allows for the water flowing through the source pipe 141 to be targeted at specific locations for cleaning purposes. The invention 100 comprises a hose 101, a nozzle apparatus 102, and a source apparatus 103. The nozzle apparatus 102 attaches to the hose 101. The source apparatus 103 attaches to the hose 101. The source apparatus 103 forms a detachable fluidic connection to the source pipe 141. The hose 101 transports water from the source apparatus 103 to the nozzle apparatus 102. The nozzle apparatus 102 discharges the water received from the source pipe 141 into the supply side source 104. In the first potential embodiment of the disclosure, the supply side source 104 is a shower.

The supply side source 104 provides a source of water that is under pressure. In the first potential embodiment of the disclosure, the supply side source 104 is a structure known as a shower. The shower is defined elsewhere in this disclosure. The supply side source 104 further comprises a source pipe 141 and a third exterior screw thread 113.

The source pipe 141 is a pipe. The source pipe 141 forms a fluidic connection between a source of fresh water, often referred to as the "supply side" of a domestic plumbing system, and the supply side source 104 of this disclosure. The third exterior screw thread 113 attaches to the source apparatus 103. The third exterior screw thread 113 forms a portion of a third threaded connection 163 that attaches the source apparatus 103 to the source pipe 141 of the supply side source 104.

The hose 101 is a fluid transport structure. The hose 101 is a prism-shaped structure. The hose 101 is a hollow structure. The hose 101 transports water received from the source pipe 141 through the source apparatus 103 to the nozzle apparatus 102. The hose 101 is defined elsewhere in this disclosure. The hose 101 further comprises a first exterior screw thread 111 and a second exterior screw thread 112.

The first exterior screw thread 111 attaches to the congruent end of the hose 101. The first exterior screw thread 111 forms a portion of a first threaded connection 161 that attaches the hose 101 to the nozzle apparatus 102.

The second exterior screw thread 112 attaches to the congruent end of the hose 101 that is distal from the first exterior screw thread 111. The second exterior screw thread 112 forms a portion of a second threaded connection 162 that attaches the hose 101 to the source apparatus 103.

The nozzle apparatus 102 is a mechanical structure. The nozzle apparatus 102 receives water under pressure from the hose 101. The nozzle apparatus 102 discharges the water as a spray into the privacy space formed by the supply side source 104. The water discharged by the nozzle apparatus 102 is used to clean the supply side source 104. The nozzle apparatus 102 removably attaches to a congruent end of the prism structure of the hose 101. In the first potential embodiment of the disclosure, the nozzle apparatus 102 is a spray nozzle. The nozzle and the spray nozzle are defined elsewhere in this disclosure. The nozzle apparatus 102 comprises a first interior screw thread 121, a first rotary union 131, and a nozzle structure 151.

The first interior screw thread 121 attaches to the first rotary union 131 of the nozzle apparatus 102. The first interior screw thread 121 forms a portion of the first threaded connection 161. The first threaded connection 161 forms a fluidic connection with the first exterior screw thread 111 of the hose 101 that: a) receives water from the hose 101; and, b) discharges the received water into the first rotary union 131 of the nozzle apparatus 102.

The first rotary union 131 is a rotary union that allows for the adjustment of the direction of the water flowing through the nozzle apparatus 102 relative to the center axis of the hose 101. The first rotary union 131 allows for the adjustment of the angle of the direction of the water flow as the water is flowing through the nozzle apparatus 102.

The nozzle structure 151 is a nozzle that forms the port that discharges water received under pressure from the hose 101 for cleaning purposes.

In the first potential embodiment of the disclosure, the nozzle apparatus 102 is made completely from brass (CAS 12597-71-6).

The source apparatus 103 is a fitting. The source apparatus 103 forms a fluidic connection between the source pipe 141 and the hose 101. The source apparatus 103 receives water under pressure from the source pipe 141. The source apparatus 103 transports the water received under pressure to the hose 101. The source apparatus 103 removably attaches to the source pipe 141. The source apparatus 103 comprises a second interior screw thread 122, a third interior screw thread 123, and a second rotary union 132.

The second interior screw thread 122 attaches to the second rotary union 132 of the source apparatus 103. The second interior screw thread 122 forms a portion of the second threaded connection 162. The second threaded connection 162 forms a fluidic connection with the second exterior screw thread 112 of the hose 101 that: a) receives water from the first rotary union 131 of the source apparatus 103; and, b) discharges the received water into the hose 101.

The third interior screw thread 123 attaches to the second rotary union 132 of the source apparatus 103. The third interior screw thread 123 forms a portion of the third threaded connection 163. The third threaded connection 163 forms a fluidic connection with the third exterior screw thread 113 of the source pipe 141 that: a) receives water from the first rotary union 131; and, b) discharges the received water into the second rotary union 132 of the source apparatus 103.

The second rotary union 132 is a rotary union that allows for the adjustment of the direction of the water flowing through the source apparatus 103 relative to the center axis of the source pipe 141 of the supply side source 104. The second rotary union 132 allows for the adjustment of the angle of the direction of the water flow as the water is flowing through the source apparatus 103.

In the first potential embodiment of the disclosure, the source apparatus 103 is made completely from brass (CAS 12597-71-6).

In the second potential embodiment of the disclosure, a quick connect fitting is installed between the third exterior screw thread 113 of the supply side source 104 and the third interior screw thread 123 of the source apparatus 103. The quick connect fitting is defined elsewhere in this disclosure.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Brass: As used in this disclosure, brass (CAS 12597-71-6) refers to a metal alloy that is formed as a mixture of the elements zinc and copper.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Exterior: As used in this disclosure, the exterior is used as a relational term that implies that an object is not contained within the boundary of a structure or a space.

Exterior Screw Thread: An exterior screw thread is a ridge wrapped around the outer surface of a tube in the form of a helical structure that is used to convert rotational movement into linear movement.

Fitting: As used in this disclosure, a fitting is a component that attaches a first object to a second object. The fitting is used to forming a fluidic connection between the first object and the second object.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluidic Circuit: As used in this disclosure, a fluidic circuit is a closed loop path through which a fluid flows. The closed loop will generally initiate and terminate at reservoir.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Gas: As used in this disclosure, a gas refers to a state (phase) of matter that is fluid and that fills the volume of the structure that contains it. Stated differently, the volume of a gas always equals the volume of its container.

Helix: As used in this disclosure, a helix is the three-dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Hose: As used in this disclosure, a hose is a flexible hollow prism-shaped device that is used for transporting liquids and gases. When referring to a hose in this disclosure, the terms inner dimension and outer dimension are used as they would be used by those skilled in the plumbing arts.

Interior: As used in this disclosure, the interior is used as a relational term that implies that an object is contained within the boundary of a structure or a space.

Interior Screw Thread: An interior screw thread is a groove that is formed around the inner surface of a tube in the form of a helical structure that is used to convert rotational movement into linear movement.

Liquid: As used in this disclosure, a liquid refers to a state (phase) of matter that is fluid and that maintains, for a given pressure, a fixed volume that is independent of the volume of the container.

Negative Space: As used in this disclosure, negative space is a method of defining an object through the use of open or empty space as the definition of the object itself, or, through the use of open or empty space to describe the boundaries of an object.

Nozzle: As used in this disclosure, a nozzle is a device that receives fluid under pressure and releases the fluid in a controlled manner into an environment.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Pipe: As used in this disclosure, a pipe is a hollow prism-shaped device that is suitable for use in transporting a fluid. The line that connects the center of the first base of the prism to the center of the second base of the prism is referred to as the axis of the prism or the centerline of the pipe. When two pipes share the same centerline they are said to be aligned. In this disclosure, the terms inner dimension of a pipe and outer dimension are used as they would be used by those skilled in the plumbing arts.

Port: As used in this disclosure, a port is an aperture formed in an object that allows fluid to flow through the boundary of the object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Private: As used in this disclosure, the term private refers to the limitation of use of an object to a one or more individual. The term privacy refers to maintaining an object or individual in a location where the object or individual can be neither observed nor disturbed.

Quick Connect Fitting: As used in this disclosure, a quick connect fitting is a coupling that is used in fluid flow applications to quickly connect or disconnect two lines or two objects through which fluids will flow. Connections or disconnections are intended to be done by hand without the use of tools. Quick connect fittings readily and commercially available and methods for their selection and use well known and documented in the mechanical, chemical, and plumbing arts.

Rotary Union: As used in this disclosure, a rotary union is a commercially available plumbing fitting that forms fluidic connection between a stationary source and a rotating structure.

Screw: As used in this disclosure, to screw is a verb meaning: 1) to fasten or unfasten (unscrew) a threaded connection; or 2) to attach a helical structure to a solid structure.

Shower: As used in this disclosure, a shower is a mechanical structure that generates a spray of water used by a client for cleaning. The shower is typically maintained in an enclosed space that provides privacy. A community shower refers to one or more showers that do not provide for the privacy of the client.

Solid: As used in this disclosure, a solid refers to a state (phase) of matter that: 1) has a fixed volume; and, 2) does not flow.

Spray: As used in this disclosure, a spray is a plurality of liquid drops dispersed in a gas.

Spray Nozzle: As used in this disclosure, a spray nozzle is a device that receives liquid under pressure and disperses that liquid into the atmosphere as a spray.

Supply Side: As used in this disclosure, the supply side refers to the plumbing subnetwork within a residential plumbing system that provisions fresh water for use within the residence.

Target: As used in this disclosure, a target is an object used by an individual to display or improve proficiency in the striking the object with the disclosure at bar.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A shower-cleaning apparatus comprising
a hose, a nozzle apparatus, and a source apparatus;
wherein the nozzle apparatus attaches to the hose;
wherein the source apparatus attaches to the hose;
wherein the shower-cleaning apparatus is configured for use with a supply side source;
wherein the shower-cleaning apparatus is configured to removably attach to a third exterior screw thread of the supply side source;
wherein the nozzle apparatus comprises a first interior screw thread, a first rotary union, and a nozzle structure;
wherein the first rotary union attaches the first interior screw thread to the nozzle structure;
wherein the source apparatus comprises a second interior screw thread, a third interior screw thread, and a second rotary union;
wherein the second interior screw thread attaches to the second rotary union of the source apparatus;
wherein the third interior screw thread attaches to the second rotary union of the source apparatus.

2. The shower-cleaning apparatus according to claim 1 wherein the shower-cleaning apparatus forms a fluidic connection that allows for the water flowing through a source pipe to be targeted.

3. The shower-cleaning apparatus according to claim 2
wherein the source apparatus forms a detachable fluidic connection to the source pipe;
wherein the hose transports water from the source apparatus to the nozzle apparatus.

4. The shower-cleaning apparatus according to claim 3
wherein the source pipe is a pipe;
wherein the source pipe forms a fluidic connection with a source of fresh water;
wherein the third exterior screw thread attaches to the source apparatus;
wherein the third exterior screw thread forms a portion of a third threaded connection that attaches the source apparatus to the source pipe of the supply side source.

5. The shower-cleaning apparatus according to claim 4
wherein the hose is a fluid transport structure;

wherein the hose is a hollow structure;

wherein the hose transports water received from the source pipe through the source apparatus to the nozzle apparatus.

6. The shower-cleaning apparatus according to claim 5 wherein the nozzle apparatus is a mechanical structure;

wherein the nozzle apparatus receives water under pressure from the hose;

wherein the nozzle apparatus discharges the water as a spray into the supply side source.

7. The shower-cleaning apparatus according to claim 6 wherein the source apparatus is a fitting;

wherein the source apparatus forms a fluidic connection between the supply side source and the hose;

wherein the source apparatus receives water under pressure from the supply side source;

wherein the source apparatus transports the water received under pressure to the hose;

wherein the source apparatus removably attaches to the supply pipe.

8. The shower-cleaning apparatus according to claim 7 wherein the hose further comprises a first exterior screw thread and a second exterior screw thread;

wherein the first exterior screw thread attaches to the congruent end of the hose;

wherein the second exterior screw thread attaches to the congruent end of the hose that is distal from the first exterior screw thread.

9. The shower-cleaning apparatus according to claim 8 wherein the first exterior screw thread forms a portion of a first threaded connection that attaches the hose to the nozzle apparatus;

wherein the second exterior screw thread forms a portion of a second threaded connection that attaches the hose to the source apparatus.

10. The shower-cleaning apparatus according to claim 9 wherein the water discharged by the nozzle apparatus is used to clean the supply side source;

wherein the nozzle apparatus removably attaches to a congruent end of the hose.

11. The shower-cleaning apparatus according to claim 10 wherein the first interior screw thread attaches to the first rotary union of the nozzle apparatus;

wherein the first interior screw thread forms a portion of the first threaded connection;

wherein the first threaded connection forms a fluidic connection with the first exterior screw thread of the hose that: a) receives water from the hose; and, b) discharges the received water into the first rotary union of the nozzle apparatus.

12. The shower-cleaning apparatus according to claim 11 wherein the first rotary union is a rotary union that allows for the adjustment of the direction of the water flowing through the nozzle apparatus relative to the center axis of the hose;

wherein the first rotary union allows for the adjustment of the angle of the direction of the water flow as the water is flowing through the nozzle apparatus.

13. The shower-cleaning apparatus according to claim 12 wherein the nozzle structure is a nozzle that forms the port that discharges water received under pressure from the hose for cleaning purposes.

14. The shower-cleaning apparatus according to claim 13 wherein the second interior screw thread forms a portion of the second threaded connection;

wherein the second threaded connection forms a fluidic connection with the second exterior screw thread of the hose that: a) receives water from the first rotary union of the source apparatus; and, b) discharges the received water into the hose.

15. The shower-cleaning apparatus according to claim 14 wherein the third interior screw thread forms a portion of the third threaded connection;

wherein the third threaded connection forms a fluidic connection with the third exterior screw thread of the source pipe that: a) receives water from the first rotary union; and, b) discharges the received water into the second rotary union of the source apparatus.

16. The shower-cleaning apparatus according to claim 15 wherein the second rotary union is a rotary union that allows for the adjustment of the direction of the water flowing through the source apparatus relative to the center axis of the source pipe of the supply side source;

wherein the second rotary union allows for the adjustment of the angle of the direction of the water flow as the water is flowing through the source apparatus.

17. The shower-cleaning apparatus according to claim 16 wherein the nozzle apparatus forms a spray nozzle.

18. The shower-cleaning apparatus according to claim 17 wherein the nozzle apparatus is made completely from brass (CAS 12597-71-6);

wherein the source apparatus is made completely from brass (CAS 12597-71-6).

* * * * *